Patented Nov. 20, 1923.

1,474,445

UNITED STATES PATENT OFFICE.

WILLIAM H. SCHOLL AND BARNEY SCHOLL, OF HOUSTON, TEXAS.

SALAD DRESSING.

No Drawing. Application filed July 3, 1922. Serial No. 572,722.

*To all whom it may concern:*

Be it known that we, WILLIAM H. SCHOLL and BARNEY SCHOLL, citizens of the United States, residing at Houston, in the county of Harris and State of Texas, have invented certain new and useful Improvements in Salad Dressing, of which the following is a specification.

This invention relates to an improved salad dressing, and embodies a novel process of combining the ingredients thereof.

One object of the invention is to produce a novel combination of ingredients to form a salad dressing, said ingredients being combined by a novel process.

With the above and other objects in view the invention relates to a novel combination of ingredients combined by a novel process, to produce a food and hereinafter described.

The ingredients employed in the combination are high distilled cotton seed oil, vinegar, sugar, mustard, salt, yolks of eggs, pepper and garlic.

In order to produce a quantity of the salad dressing the ingredients are combined in substantially the following proportions, a quantity of five gallons being taken as a basis:—

5 gallons high distilled cotton seed oil.
1 gallon vinegar.
2 pounds sugar.
1 pound mustard.
4 ounces salt.
6 dozen yolks of eggs.
25 ounces pepper.
5 ounces garlic.

The ingredients are combined in the following manner:—

The garlic is brayed and mixed with the vinegar and the mixture is slowly boiled, in an approximately air tight vessel for about three and one-half hours; the mixture is then permitted to cool and is strained. The pepper, sugar, mustard, and salt are then mixed together and enough of the vinegar mixture is added to form a paste. The yolks of eggs are then added and this mixture is then placed in a mixing machine, preferably an electric mixing machine, and the machine permitted to run at slow speed for about five minutes forming an emulsion, the base of the dressing. The machine is then speeded up and the oil is dripped into the mixture at the rate of one-half pint a minute continuously until all of the oil is added to the mixture. During this process the remainder of the vinegar mixture is gradually added to keep the mixture at the desired consistency.

The resulting product will be a salad dressing in an emulsified form.

It is, of course, understood that the ingredients above specified can be varied somewhat, that is certain ingredients of a similar nature may be substituted for some of those named, as for example olive oil may be used instead of cotton seed oil, and another acid, as for example lemon juice may be substituted for vinegar. It may also be found practical to use egg powder instead of the yolks of eggs. Our invention apprehends the use of the ingredients named or substitutes therefor so long as we keep within the scope of the appended claims.

What we claim is:—

1. The process of preparing a salad dressing consisting of mixing together vinegar and brayed garlic and boiling and straining the same; then mixing pepper, powdered sugar, mustard and salt and adding sufficient of said first mentioned mixture to form a paste then slowly agitating said paste, meanwhile adding to it the yolks of eggs, then dripping into the mixture thus formed oil at the rate of approximately one-half pint a minute, meanwhile vigorously agitating the mixture and adding more of said vinegar, until it is reduced to an emulsion.

2. The process of preparing a salad dressing by mixing the following ingredients in approximately the proportions stated in the following manner to wit:—mixing 5 ounces of brayed garlic with 1 gallon of vinegar, and boiling and straining the same and permitting the vinegar to cool; then mixing 25 ounces pepper, 2 pounds of powdered sugar, 1 pound mustard and 4 ounces salt with enough of said first mentioned mixture to form a paste; then slowly agitating the paste, meanwhile adding to it 6 dozen yolks of eggs; then dripping into the mixture 5 gallons of oil at the rate of one-half pint a minute and continuing the agitation until the mixture is emulsified, meanwhile adding to it the remainder of said first mentioned mixture.

In testimony whereof we have signed our names to this specification in the presence of two subscribing witnesses.

WILLIAM H. SCHOLL.
BARNEY SCHOLL.

Witnesses:
E. V. HARDWAY,
L. M. HOCK.